US010565591B2

(12) United States Patent
Lee et al.

(10) Patent No.: US 10,565,591 B2
(45) Date of Patent: Feb. 18, 2020

(54) BRIDGE FOR COMMUNICATING DATA OUTSIDE OF A MOBILE APPLICATION

(71) Applicant: PAYPAL, INC., San Jose, CA (US)

(72) Inventors: Elliot Michael Lee, San Francisco, CA (US); Evan Hahn, San Francisco, CA (US); Adam Lawrence Colson, Austin, TX (US); Quinn J. Neumiiller, San Francisco, CA (US); Luke Korth, San Francisco, CA (US); Richard Shin, Oakland, CA (US)

(73) Assignee: PAYPAL, INC., San Jose, CA (US)

( * ) Notice: Subject to any disclaimer, the term of this patent is extended or adjusted under 35 U.S.C. 154(b) by 388 days.

(21) Appl. No.: 15/440,637

(22) Filed: Feb. 23, 2017

(65) Prior Publication Data

US 2018/0240118 A1    Aug. 23, 2018

(51) Int. Cl.
| | | |
|---|---|---|
| G06F 16/56 | (2019.01) | |
| G06Q 20/40 | (2012.01) | |
| H04L 29/06 | (2006.01) | |
| G06F 16/958 | (2019.01) | |
| G06F 16/955 | (2019.01) | |

(52) U.S. Cl.
CPC ..... *G06Q 20/4014* (2013.01); *G06F 16/9566* (2019.01); *G06F 16/986* (2019.01); *H04L 63/083* (2013.01)

(58) Field of Classification Search
None
See application file for complete search history.

(56) References Cited

U.S. PATENT DOCUMENTS

| | | | | |
|---|---|---|---|---|
| 2013/0133054 A1* | 5/2013 | Davis | ................... | G06F 21/316 726/7 |
| 2016/0087957 A1* | 3/2016 | Shah | ................... | H04L 63/205 726/1 |

OTHER PUBLICATIONS

Unknown "What are Chrome Custom Tabs?" [Online] [retrieved on Feb. 8, 2017]. Retrieved from the Internet: <URL: https://developer.chrome.com/multidevice/android/customtabs>.
Unknown "Access the http response headers in a WebView?" [Online] Stack Overflow [retrieved on Nov. 30, 2016]. Retrieved from the Internet: <URL: http://stackoverflowcomquestions/3134389accessthehttpresponseheadersinawebview>.

(Continued)

*Primary Examiner* — Craig C Dorais
(74) *Attorney, Agent, or Firm* — Haynes and Boone, LLP

(57) ABSTRACT

In certain computing environments, such as certain applications for mobile devices, popup browser windows may not be supported. This can cause functionality issues, as an existing website may use a popup window to perform a service (such as authentication). Thus, if a user is viewing a webpage within an application (such as a WebView application) that does not support popups, the user may be unable to proceed with a particular action. This issue can be resolved, in various embodiments, by introducing functionality that causes a separate browser program to be opened and then returning the user back to the mobile app via a particular URI (such as a deep link URI). By providing this functionality, mobile apps that rely on underlying web content with popups can thus be made to function in an environment in which they would otherwise fail, in various cases.

20 Claims, 5 Drawing Sheets

(56) References Cited

OTHER PUBLICATIONS

Unknown "Best approach to pass data from web view to native app (Windows, iOS & Android)" [Online] Stack Overflow [retrieved on Nov. 30, 2016]. Retrieved from the Internet: <URL: http://stackoverflow.com/questions/21378169/bestapproachtopassdatafromwebviewtonativeappwindowsiosandroid>.

Unknown "Building Web Apps in WebView" [Online] Android Developers [retrieved on Nov. 30, 2016]. Retrieved from the Internet: <URL: https://developer.android.com/guide/webapps/webview.html>.

Unknown "how to display javascript popup in android webview" [Online] Stack Overflow [retrieved on Nov. 30, 2016]. Retrieved from the Internet: <URL: http://stackoverflow.com/questions/21354551/howtodisplayjavascriptpopupinandroidwebview>.

Unknown "How to invoke Objective C method from Javascript and send back data to Javascript in iOS?" [Online] Stack Overflow [retrieved on Nov. 30, 2016]. Retrieved from the Internet: <URL: http://stackoverflow.com/questions/9826792/howtoinvokeobjectivecmethodfromjavascriptandsendbackdatatojavascrip>.

Unknown "How to display the Authentication Challenge in UIWebView?" [Online] Stack Overflow [retrieved on Nov. 30, 2016]. Retrieved from the Internet: <URL: http://stackoverflow.com/questions/1769888/howtodisplaytheauthenticationchallengeinuiwebview>.

Unknown "How to do authentication in UIWebView properly?" [Online] Stack Overflow [retrieved on Nov. 30, 2016]. Retrieved from the Internet: <URL: http://stackoverflow.com/questions/8999776/howtodoauthenticationinuiwebviewproperly>.

Unknown "Opening link in popup-webview like Twitter" [Online] Stack Overflow [retrieved on Nov. 30, 2016]. Retrieved from the Internet: <http://stackoverflow.com/questions/27636341/openinglinkinpopupwebviewliketwitter>.

Unknown "Passing Data to and From an Embedded UIWebView" [Online] Stack Overflow [retrieved on Nov. 30, 2016]. Retrieved from the Internet: <URL: http://stackoverflow.com/questions/17117713/passingdatatoandfromanembeddeduiwebview>.

Unknown "Opening popup links in UIWebView, possible?" [Online] Stack Overflow [retrieved on Nov. 30, 2016]. Retrieved from the Internet: <URL: http://stackoverflow.com/questions/1245224/openingpopuplinksinuiwebviewpossible>.

Unknown "How to handle JavaScript dialog popup in WebView" [Online] Stack Overflow [retrieved on Nov. 30, 2016]. Retrieved from the Internet: <URL: http://stackoverflow.com/questions/16819381/howtohandlejava scriptdialogpopupinwebview>.

Unknown "Invoke method in objective c code from HTML code using UIWebView" [Online] Stack Overflow [retrieved on Nov. 30, 2016]. Retrieved from the Internet: <URL: http://stackoverflow.com/questions/15537320/invokemethodinobjectiveccodefromhtmlcodeusinguiwebview/15541607 #15541607>.

Unknown "WebView" [Online] Android Developers [retrieved on Jan. 31, 2017]. Retrieved from the Internet: <URL: https://developer.android.com/reference/android/webkit/WebView.html>.

Unknown "SFSafariViewController" [Online] Apple Developer Documentation [retrieved Feb. 8, 2017]. Retrieved from the Internet: <URL: https://developer.apple.com/reference/safariservices/sfsafariviewcontroller>.

Unknown "WKWebView—WebKit" [Online] Apple Developer Documentation [retrieved on Feb. 8, 2017]. Retrieved from the Internet: <URL: https://developer.apple.com/reference/webkit/wkwebview>.

* cited by examiner

BRIDGE FOR COMMUNICATING DATA OUTSIDE OF A MOBILE APPLICATION

TECHNICAL FIELD

This disclosure relates to computer networks and systems. More particularly, this disclosure relates to various techniques that can be used for conveying data to a particular program executing on a mobile device, where the program may have limited viewing capabilities (such as an Android or iOS WebView program that does not support a JavaScript popup window, as non-limiting examples).

DETAILED DESCRIPTION

Figure 1:
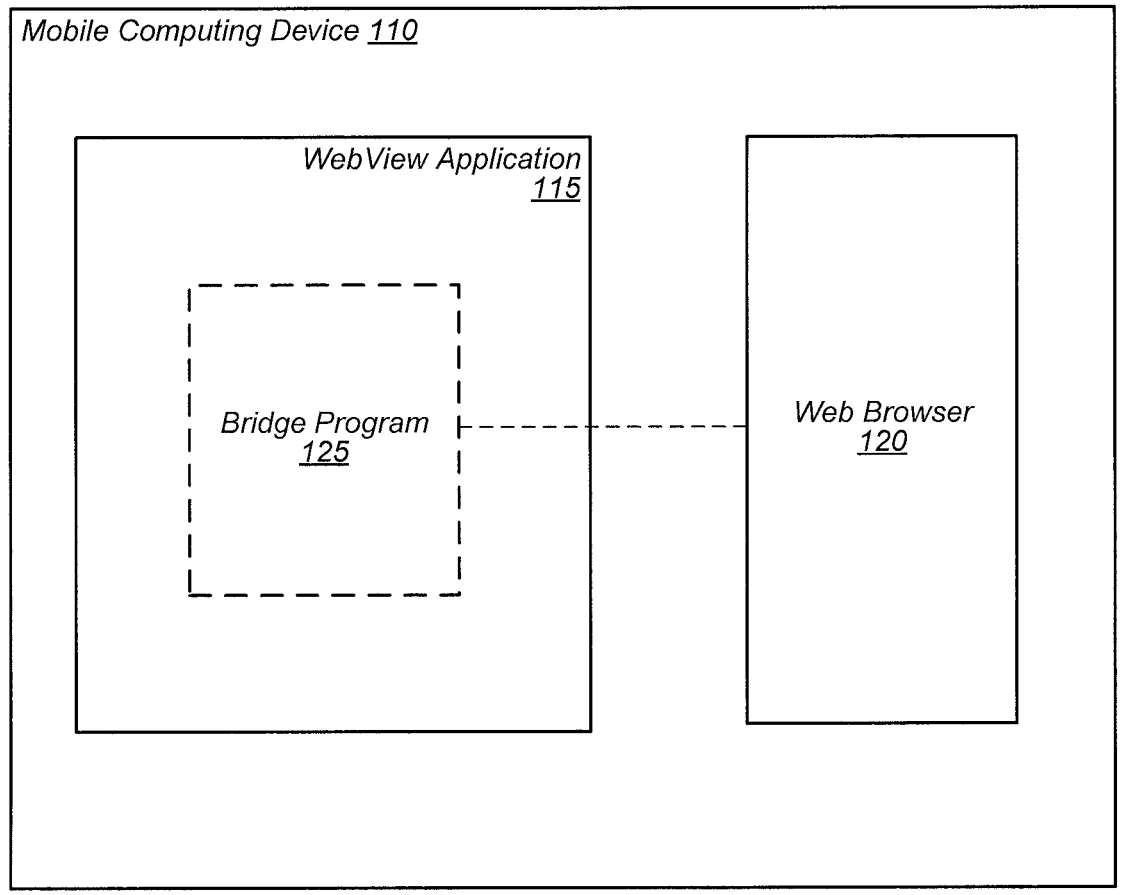
FIG. 1 illustrates block diagram of one embodiment of a mobile computing device.

In some environments, mobile devices such as smartphones may have non-browser applications on them that allow web content, such as HTML and other documents, to be viewed within the application. These applications may allow the web content to be viewed via a "WebView" (such as UIWebView or WKWebView in iOS™ (see, e.g., https://developer.apple.com/reference/uikit/uiWebView or WKWebView (see, e.g., https://developer.apple.com/reference/webkit/wkwebview)), or WebView for Android™ (see, e.g., https://developer.android.com/reference/android/webkit/WebView.html).

In applications allowing web content to be viewed, not all functionality of a typical web browser (such as Chrome™ or Safari™) may be supported, particularly on mobile devices. Thus, while an application on a mobile device (or other computing system) may support viewing of web content such as HTML, the application may not support popup windows and/or other features of robust web browsers.

Lack of support for popup windows in a WebView can cause functionality problems for certain applications. In particular, an application that uses WebView technology (hereinafter referred to as a "WebView application") may not be able to interface with certain websites.

In one instance, a mobile application may have a WebView application that requires a user to authenticate before taking a further action. This user authentication may be performed by a website not under the direct control of an entity associated with the WebView application.

Specifically, a WebView application may want a user to authenticate to a payment service such as one provided by PayPal™ before allowing the user to make an in-application purchase. The WebView application may be configured, however, such that normal authentication procedures for PayPal.com cannot easily be used.

An integrated view of PayPal.com within a WebView application (such as via an IFRAME) is not necessarily secure. If the user cannot see the PayPal.com URI, they may be exposing their login name and password to theft via phishing, for example (as a malicious programmer could set up a site to look like PayPal.com, but instead steal the user credentials). A possible solution is to use a pop-up window in which the PayPal.com URI can be seen. However, a pop-up window for PayPal.com (e.g., a window that opened up as an overlay on top of at least a portion of the WebView application, allowing the user to see the PayPal.com URI and authenticate) may be unsupported by the WebView application. If a WebView application does not support popups, and using an integrated website view of PayPal.com is potentially insecure, it may therefore be difficult for a user to login to a PayPal™ account from within the WebView application (and therefore potentially preventing the user from engaging in a transaction).

Techniques related to solving the above problems with WebView applications that do not support popup windows are described below. In some embodiments, an application program on a mobile device (the WebView application itself, or an assistant program, for example) may serve as a "bridge" between the WebView application and a website such as PayPal.com that provides a service (such as user authentication).

Note that many different applications are possible for the techniques described in this disclosure, and that these techniques are not limited to user authentication services and/or to PayPal.com. The techniques described herein can be useful any time that return data is needed from a website, in various contexts, and particularly when return data that might normally be generated from a popup window is needed by a WebView application that does not support popups itself.

Note that a WebView application, as that term is used herein, includes applications that use other user interface technology besides WebView, in various embodiments. In other words, one or more portions of a WebView application may display content in having a form other than web content.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of one embodiment of a mobile computing device 110 is shown. In this figure, mobile computing device 110 includes a WebView application 115, a web browser 120, and a bridge program 125. Bridge program 125 is shown as being part of WebView application in the embodiment of FIG. 1, but may be wholly or partially separate in other embodiments.

Mobile computing device 110 may be a device such as a smartphone (e.g. an iPhone™, Samsung Galaxy™, etc.) that has phone capability as well as internet capability. Mobile computing device may have any number of other features or stored data that are not shown in FIG. 1.

WebView application 115 may be a custom app for a particular merchant (or any other entity). All or a portion of this application may access a website for a merchant (or any other entity) via a WebView that allows HTML or other web-formatted content to be displayed within the WebView application 115. Thus, a merchant may be able to more easily create a custom application for a mobile device by using WebView to link its app to a pre-existing website. (Note that while various examples in this specification refer to a merchant or a merchant website, the technology described herein is not limited specifically to merchants, and can be used in any number of different contexts).

Web browser 120 may be any program that is capable of accessing and displaying web pages from the internet. Thus, web browser 120, in various embodiments, may be Google Chrome™, Safari™, Firefox™, or another browser. Web browser 120 may be a special version of software that is optimized for usage on a mobile device such as a smartphone, in some embodiments. Web browser 120 typically allows a user to type in or navigate to various Uniform Resource Identifiers (URIs) and will then display HTML content or other web content at that URI.

Bridge program 125 includes functionality that allows a user of WebView application 115 to perform one or more actions that might otherwise require a popup window that is unsupported by WebView application 115, in the embodiment of FIG. 1. Bridge program 125 therefore, in various embodiments, allows a user to perform actions (such as authentication actions) via web browser 120, and then have data resulting from the those actions (such as an authentication token indicating authentication details like a time and date of authentication) be delivered back to WebView application 115.

Bridge program 125 may be included as a library module that is compiled with WebView application 115, in one embodiment. In another embodiment, Bridge program 125 could be separately compiled and accessed by WebView application 115 as needed. Bridge program 125 may have various functions defined for an application programming interface (API) that it supports.

Figure 2:
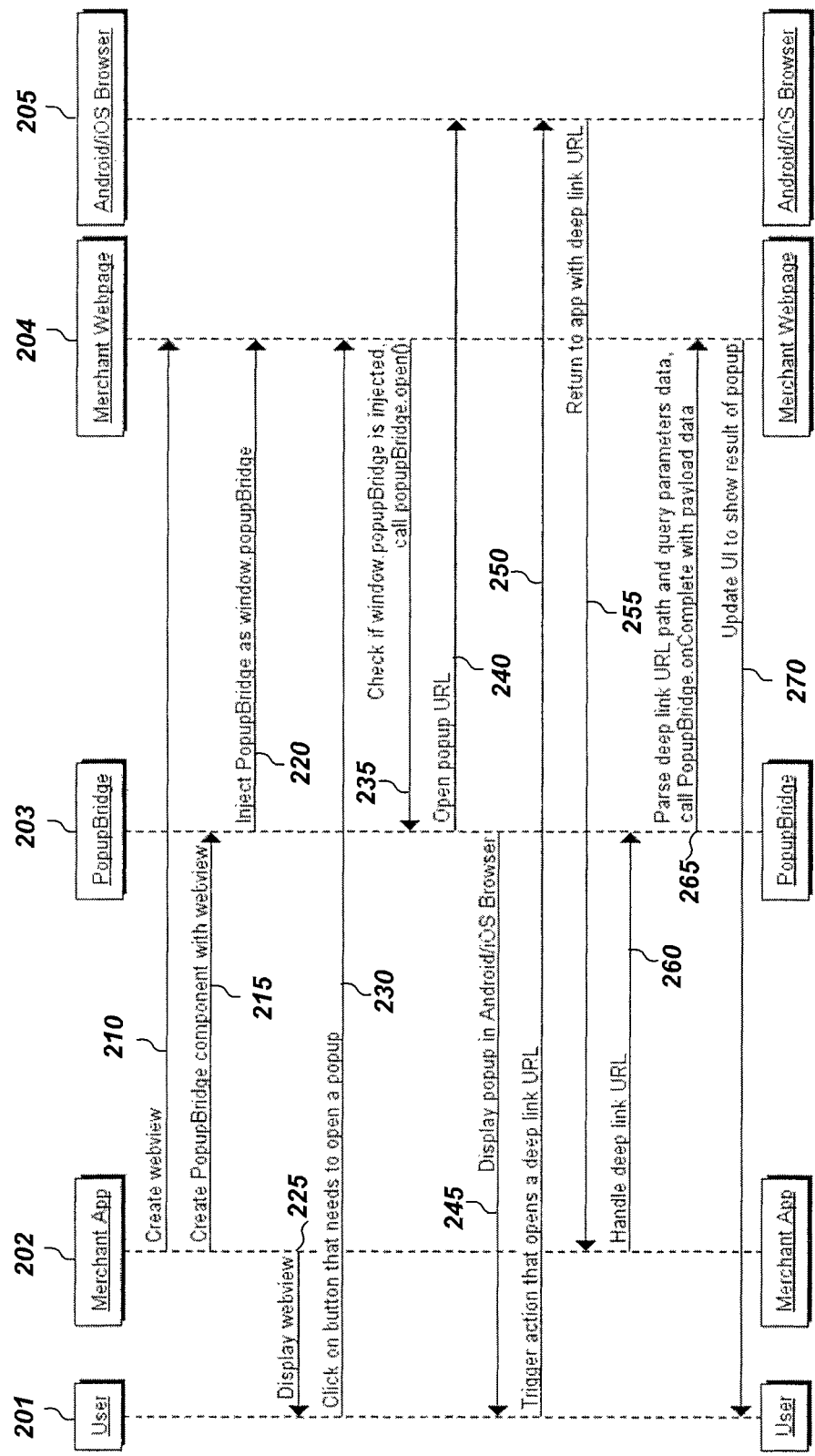
FIG. 2 illustrates an action diagram of one embodiment relating to a technique for getting return data (e.g. from a website service) delivered to an application on a computing device (e.g. a WebView application).

Turning to FIG. 2, an action diagram is shown of one embodiment relating to a technique for getting return data (e.g. from a website service) delivered to a WebView application. In this diagram, various actions are taken by user 201, merchant app 202 (which is a WebView app in this embodiment), PopupBridge 203 (which corresponds to bridge program 125 in this embodiment), merchant webpage 204, and web browser 205.

User 201 in this diagram is a person. Actions involving user 201, however, may include the user receiving information via a mobile computing device and/or the user taking one or more actions via the mobile computing device. Merchant app 202 and Popup Bridge 203 may both be running on the user's mobile computing device, as well as web browser 205. Merchant webpage 204 corresponds to a webpage of a particular website somewhere on the Internet, in this example.

In operation 210, merchant app 202 creates a WebView that references merchant webpage 204. The WebView for operation 210, for example, may include a view of a merchandise page on which a user can select items or services for purchase.

In operation 215, merchant app 202 creates a PopupBridge component with the WebView created in operation 210, and in operation 220, the PopupBridge component is injected into merchant webpage 204. Injection, in operation 220, may include adding JavaScript (or another web language) code into a source page (e.g. on the merchant webpage 204 as viewed through the WebView) in order to expose a JavaScript interface to PopupBridge 203 via the web page.

In operation 225, merchant app 202 displays a WebView of the merchant webpage 204 to the user 201. In operation 230, the user selects a page element that needs to open a popup (e.g. clicking on a button). In operation 235, if the PopupBridge component has been injected, a call to the PopupBridge is made by merchant webpage 204 from within the created WebView for that page as shown on merchant app 202. E.g., operation 235 may include a function such as window.PopupBridge.open being called from within merchant page 204 (instead of calling an "ordinary" popup window function such as window.open). Note that these and related functions may be implemented in JavaScript in some embodiments, and/or in other web programming languages in other embodiments.

In operation 240, PopupBridge 203 opens a URI via web browser 205. This may include launching a browser window separate from merchant app 202 on a mobile computing device such as a smartphone, wearable smart glasses, etc. For example, operation 240 may include opening a particular URI (such as https://www.paypal.com) via Google Chrome™ or Safari™ web browsers. In operation 245, the opened URI is displayed to a user. Once the URI (which might ordinarily be a popup window in a supported setting such as Chrome for a desktop PC) is opened in the web browser, the user can take various actions via the URI. This may include logging into an account, requesting particular data, etc. Opening a URI via a web browser, in some embodiments, also may include using a browser view such as SFSafariViewController (see, e.g., https://developer.apple.com/reference/safariservices/sfsafariviewcontroller) or Chrome Custom Tabs (see, e.g., https://developer.chrome.com/multidevice/android/customtabs).

In operation 250, the user triggers an action that opens a deep link URI. This action could include hitting a "submit" button on the particular URI opened via web browser 205, or any other action on the particular URI displayed via the web browser. In various embodiments, the web browser 205 will contain or acquire the deep link URI, which can then be used to return a user to merchant app 202.

In some instances, the deep link URI is passed to web browser 205 by PopupBridge 203 in association with the particular URI being opened in web browser 205. Upon a predetermined event occurring (e.g., after a user hits a "submit" button or "done" button in web browser 205, after a certain amount of time, or after another event), web browser 205 will open the deep link URI, in various embodiments, causing the user to return to merchant app 202. Thus, in some embodiments, the web page for the particular URI does not need to be modified. In one embodiment, the deep link URI could be passed to the particular URI as a parameter when opening web browser 204 in operation 240; this parameter could then be used when the user triggers the action in operation 250 to open the deep link URI. In other instances, the web page could be programmed to include the deep link URI, or is able to calculate the deep link URI from information provided to the web page.

Note that the deep link URI, in this example, is a URI that leads back to merchant app 202 (rather than a URI out on the internet). The deep link URI can refer not just to merchant app 202, but to a particular portion of merchant app 202. Thus, the deep link URI can point to a screen where the user was about to buy merchandise, for example. The user could be returned to this screen after operation 250. The deep link format, in one embodiment, is "scheme://popupbridgev1/data", where scheme is the URI scheme and data is an optional URI path and/or query string that the source page receives in a payload.

Accordingly, in operation 255, web browser 205 initiates a return to merchant app 202 via the deep link URI from operation 250. In operation 260, merchant app 202 handles the deep link URI, e.g., by invoking a method of Popup-Bridge 203. In operation 265, PopupBridge 203 parses the deep link and causes an update of merchant webpage 204. Parsing the deep link may include extracting various information in the deep link URI, which may be passed as a URI parameter. Extracted information can include any return data generated by the web browser 205, such as an authentication token, or any other result or information. In operation 270, merchant webpage 204 (within the WebView for merchant app 202) is updated to show results of the popup window call that was previously handled. For example, on a purchasing page, the page could be updated to include a selectable element that says "Pay Now With PayPal", once the user has successfully logged in, for example.

Figure 3:
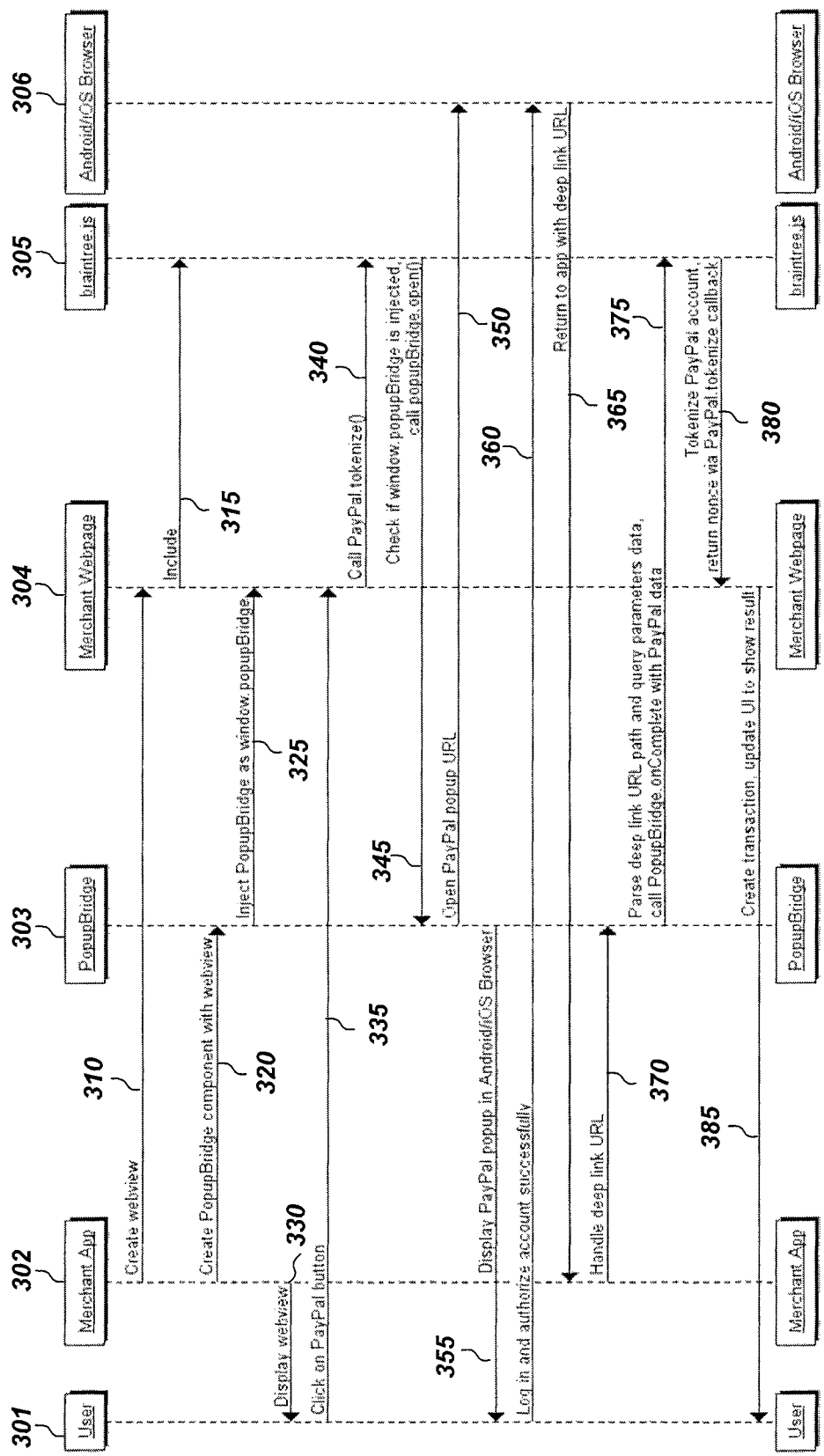
FIG. 3 shows an action diagram related to that of FIG. 2, according to some embodiments.

Turning to FIG. 3, an action diagram related to FIG. 2 is shown. This diagram includes various actions specific to a PayPal-oriented flow that relate to creating a transaction for a user after the user has logged in with PayPal (e.g., including actions 310, 315, 320, 325, 330, 335, 340, 345, 350, 355, 360, 365, 370, 375, 380, and 385). This diagram also depicts various actions relative to user 301, merchant app 302, PopupBridge 303, merchant webpage 304, Braintree.js 305 (a JavaScript file), and web browser 306.

Figure 4:
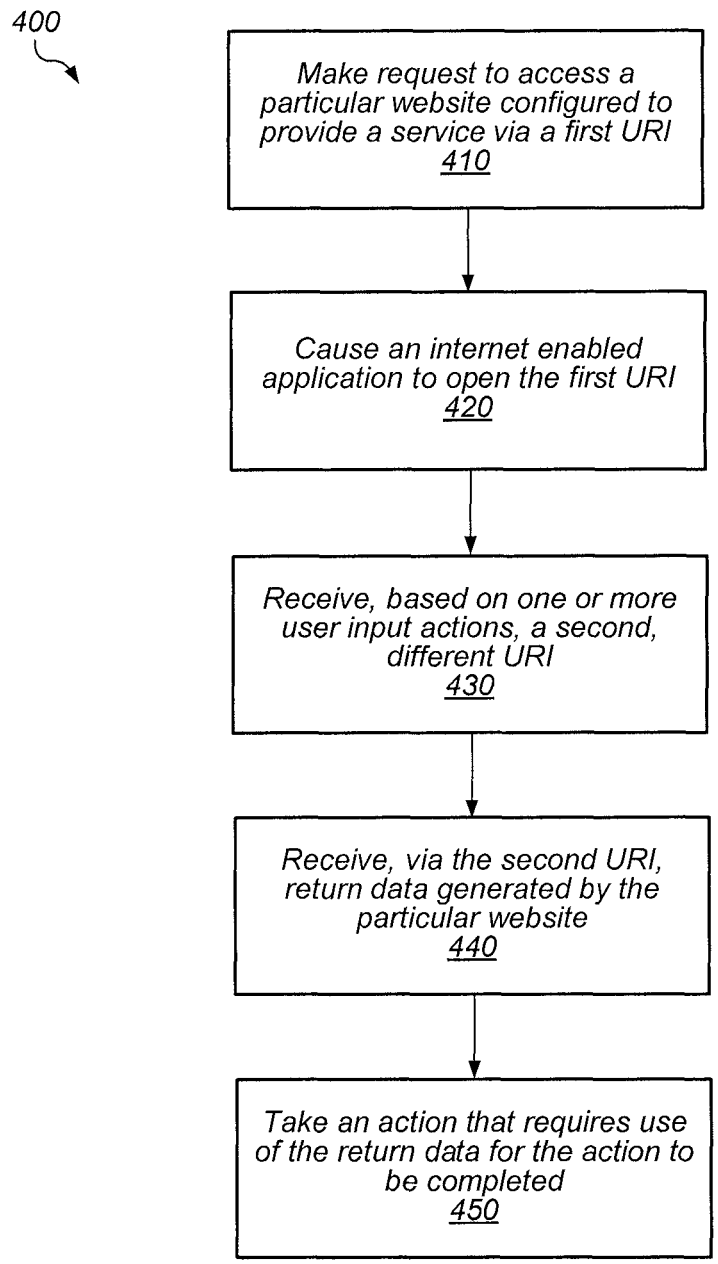
FIG. 4 illustrates a flowchart of a method, according to some embodiments.

Turning to FIG. 4, a flowchart of one embodiment of a method 400 is shown. Any or all operations described in method 400 may be performed by one or more processes running on a mobile computing device in some embodiments, or one or more processes running on any suitable computer system or electronic device in other embodiments. For ease of explanation, however, operations will be described as below.

In operation 410, a request is made (e.g., by an application process executing on a mobile computing device) for the application process to access a particular website that is configured to provide a service via a first uniform resource identifier (URI) on the particular website. Thus, in one embodiment, operation 410 includes WebView application 115 (which may be a merchant application) making a request to access a particular website at a first URI.

In operation 420, responsive to the request in operation 410, mobile computing device 110 causes an internet enabled application, other than the application process, to open the first URI on the particular website. Thus, operation 420 includes causing web browser 120 to open the first URI, in one embodiment. In particular, web browser 120 may open the first URI on a mobile computing device when another application (e.g. a merchant WebView app) is not configured to support popup windows. As further described below, the user can then take action on a webpage displayed in web browser 120, and resulting data can be conveyed back to WebView application 115.

In operation 430, mobile computing device 110 receives, based on one or more user input actions made by a user of the internet enabled application a second, different URI. This operation therefore relates, in one embodiment, to a user inputting data to a particular website (e.g. one that provides a service). The user may provide a username and password (for example, to authenticate an account). After the user makes input actions on a webpage, in one embodiment, the webpage may then cause a second URI to be activated by the mobile computing device. This URI may be a "deep link" URI, as mentioned above, that upon being opened in web browser 120, causes WebView application 115 to be loaded onto a visual display of mobile computing device 110 (that is, WebView application 115 can be brought to the forefront of a user's view, and/or opened if not already open). Note that the user input actions may be provided via a means for providing user input, such as a capacitive touchscreen, button, keyboard, mouse, motion sensor, image recognition device configured to capture a spatial gesture made by the user, etc. As noted above relative to FIG. 2, the second URI (a deep link URI in various embodiments) may be passed to web browser 120 in association with web browser 120 opening.

The second URI (deep link URI in various embodiments) received in operation 430 may include additional return data as parameters to the URI. For example, the second URI might be represented as "custom_merchant_app://popupbridgev1/[data]", where the "[data]" may be one or more pieces of data that can be used by WebView Application 115. This data may include an authentication token, an identity token, a payment token usable to fund a transaction, and/or any other information.

In operation 440, mobile computing device 110 receives, via the second URI, return data generated by a particular website corresponding to the first URI (from operation 410). Receiving this return data may, as noted above, include receiving the data as part of the second URI. Mobile computing device 110 may parse this data from the second URI in various embodiments (by stripping out other data and/or separating multiple pieces of delimited data as necessary).

In operation 450, WebView Application 115 takes an action, responsive to user input, that requires use of the return data for the action to be completed. This action may be initiating a purchase, completing a purchase, or any other action. In one example, a user's PayPal account information may be provided to WebView Application 115 via the second URI (after the user has authenticated to PayPal via the first URI). This account information can then be used to make a purchase. In this example, the user input could be selecting a "Buy Now" button inside the WebView Application 115 that will not allow the user to make the purchase unless the user has already logged into PayPal (and provided necessary account details, such as an authentication token, to mobile computing device 110 and WebView Application 115).

In one embodiment of method 400, a service provided via the first URI (e.g., as discussed in operation 410) is an authentication login for an electronic payment provider (such as PayPal™). In other embodiments, the service provided could be an authentication login for another account, such as a Facebook™ account, or any other site. In some embodiments, the service that is provided could simply be the provision of data that is in possession of a particular website. Such data could be digitally signed by a cryptographic certificate corresponding to the particular website in order to vouch for its authenticity (e.g., if another party reliant on that data, such as a merchant associated with WebView Application 115, wants assurance that the data has not been tampered with).

Another embodiment of method 400 includes receiving, at an application process (e.g., WebView Application 115), a user command to execute a purchase of an item or service using an account of the user at an electronic payment provider, and responsive to the user command, causing the purchase to be paid for using the account. Thus, in some embodiments, after a user authenticates to an electronic payment provider, and return data is provided to a merchant application, the user can make a purchase.

In another embodiment of method 400, an application process of the mobile computing device (such as WebView Application 115) includes a library file with an application programming interface (API), where the API has a particular function defined that causes the internet enabled application to open the first URI. Thus, in some embodiments, bridge program 125 is included in WebView Application 115 as a library file having a particular API. This API can define different functions for one or more different website schemes that provide different services. A first function call could be used for PayPal.com, for example, or other electronic payment providers, while different function calls could be used for one or more other different websites, as desired.

In another embodiment, an application process of the mobile computing device (e.g. WebView Application 115) is not configured to allow a pop-up window to be opened to the first URI, but is configured to render displays of hypertext markup language (HTML) source documents. As discussed above, WebView Application 115, in various embodiments, can render displays of different web-formatted source documents. (And note that WebView Application 115 is not limited to particular implementations of commercial WebView technology such as Android™ WebView).

Computer-Readable Medium

Figure 5:
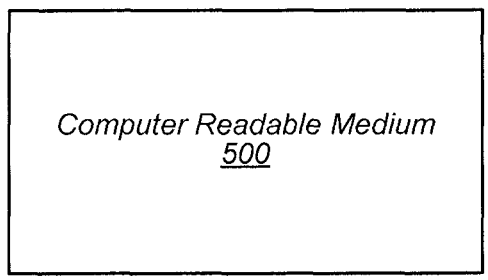
FIG. 5 is a block diagram of one embodiment of a computer readable medium.

Turning briefly to FIG. 5, a block diagram of one embodiment of a computer-readable medium 500 is shown. This computer-readable medium may store instructions corresponding to the operations of FIG. 4 and/or any techniques described herein. In various embodiments, instructions corresponding to mobile computing device 110 may be stored on computer-readable medium 500.

Program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, Java, JavaScript, or any other programming language. Note that as used herein, the term "computer-readable medium" refers to a non-transitory computer readable medium.

Computer System

Figure 6:
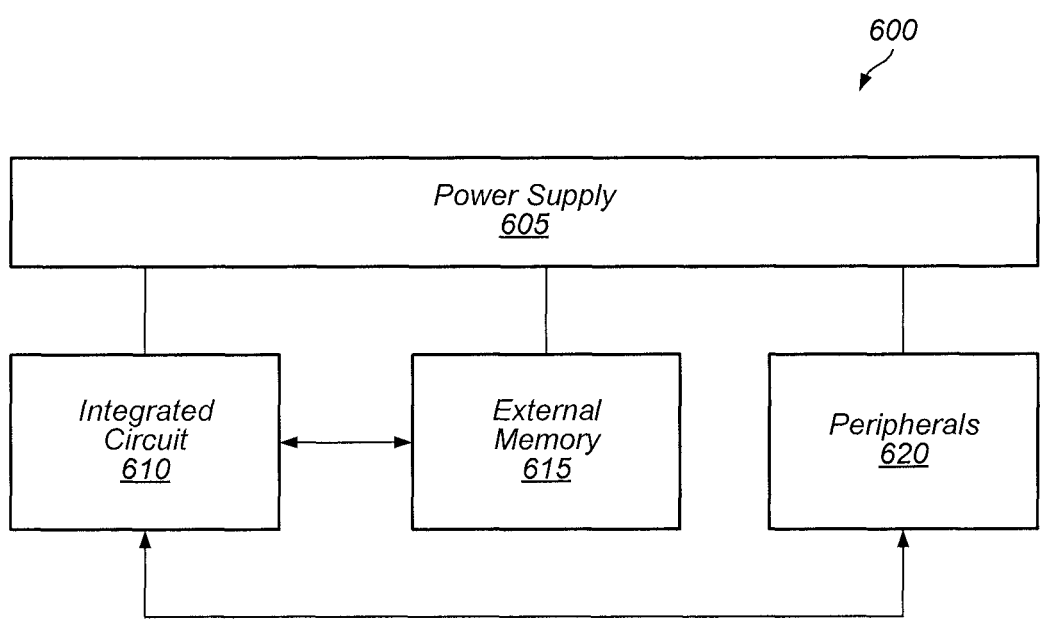
FIG. 6 is a block diagram of one embodiment of a computer system.

In FIG. 6, one embodiment of a computer system 600 is illustrated. Various embodiments of this system may be any of computer systems 105A-105D or any other computers systems as discussed above and herein. The abovementioned systems are not limited to the configuration shown in FIG. 6, however.

In the illustrated embodiment, system 600 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as Wi-Fi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A mobile computing device, comprising:
a processor;
a visual display;
a means for receiving user input; and
a non-transitory computer-readable medium having instructions stored thereon that are executable by the mobile computing device to cause the mobile computing device to perform operations comprising:
receiving a request, through an application process executing on the mobile computing device, for the application process to access a particular website, wherein the application process is not configured to allow a pop-up window to be opened to a first uniform resource identifier (URI) on the particular website, but is configured to render a display of hypertext markup language (HTML) source documents;
responsive to the request, causing an internet enabled application, other than the application process, to open the first URI on the particular website;
receiving, based on one or more user input actions through the internet enabled application, via the means for receiving user input, a second URI different from the first URI;
receiving, via the second URI from the particular website, return data generated by the particular website, wherein the return data is indicative of a service provided via the first URI; and
taking, by the application process responsive to user input, an action that requires a use of the return data for the action to be completed.

2. The mobile computing device of claim 1, wherein the service provided via the first URI is an authentication login for an electronic payment provider, and wherein the return data comprises information corresponding to authentication credentials for a user for the electronic payment provider.

3. The mobile computing device of claim 2, wherein the operations further comprise:
receiving, at the application process, a user command to execute a purchase of an item or a service using an account of the user at the electronic payment provider; and
responsive to the user command, causing the purchase to be paid for using the account.

4. The mobile computing device of claim 1, wherein the means for receiving user input comprises a touchscreen.

5. The mobile computing device of claim 1, wherein the means for receiving user input comprises a keyboard.

6. The mobile computing device of claim 1, wherein the means for receiving user input comprises an image recognition device configured to capture a spatial gesture made by a user.

7. The mobile computing device of claim 1, wherein the application process includes a library file with an application programming interface (API), wherein the API has a particular function defined that causes the internet enabled application to open the first URI.

8. A method, comprising:
making a request, by an application process executing on a mobile computing device, for the application process to access a first uniform resource identifier (URI), wherein the application process lacks support for opening pop-up windows that are openable by a web browser;
responsive to the request, causing an internet enabled application of the mobile computing device, other than the application process, to open the first URI;
receiving via a second, different URI, return data from a website associated with the first URI based on user input on the mobile computing device via the first URI using the internet enabled application, wherein the return data is indicative of a service provided via the first URI; and
taking, by the application process responsive to the user input, an action that requires use of the return data for the action to be completed.

9. The method of claim 8, wherein the internet enabled application of the mobile computing device is a mobile web browser, and wherein the mobile computing device is a smartphone.

10. The method of claim 8, wherein opening the first URI comprises opening a web browser page on a particular website.

11. The method of claim 8, wherein the user input comprises:
an entry of at least two data values into a web form displayed on a web page associated with the first URI.

12. The method of claim 11, wherein the at least two data values comprise a username and a password for a login.

13. The method of claim 8, wherein the return data comprises an authentication token associated with the first URI, wherein the authentication token includes information indicating that an identity of a user has been authenticated by the web server.

14. The method of claim 8, wherein the return data is included in the second URI via HTTP parameters.

15. The method of claim 8, wherein receiving the return data comprises the application process receiving the return data from a website associated with the first URI.

16. The method of claim 8, wherein the action that requires use of the return data for the action to be completed comprises an action requiring authentication credentials for a user account.

17. A non-transitory computer-readable medium having stored thereon instructions that are executable by a computer system to cause the computer system to perform operations comprising:
handling a request, by an application process executing on the computer system, for the application process to access a particular website, wherein the application process is a non-browser application process and lacks support for opening popup browser windows;
responsive to the request, causing an internet enabled application, other than the application process, to open a first uniform resource identifier (URI) on the particular website;
receiving, via a different URI, return data based on one or more actions via the first URI using the internet enabled application; and
providing the return data to the application process;
wherein the different URI, upon being opened at the computer system, causes the computer system to open the application process.

18. The non-transitory computer-readable medium of claim 17,
wherein handling the request comprises receiving the request from the application process; and wherein the instructions executable by the computer system comprise a program that is compiled separately from the application process.

19. The non-transitory computer-readable medium of claim 17,
wherein the instructions executable by the computer system comprise a library program that is integrated with the application process via a compilation process.

20. The mobile computing device of claim 1, wherein the application process is a non-web-browser application process.

* * * * *